Figure 1:
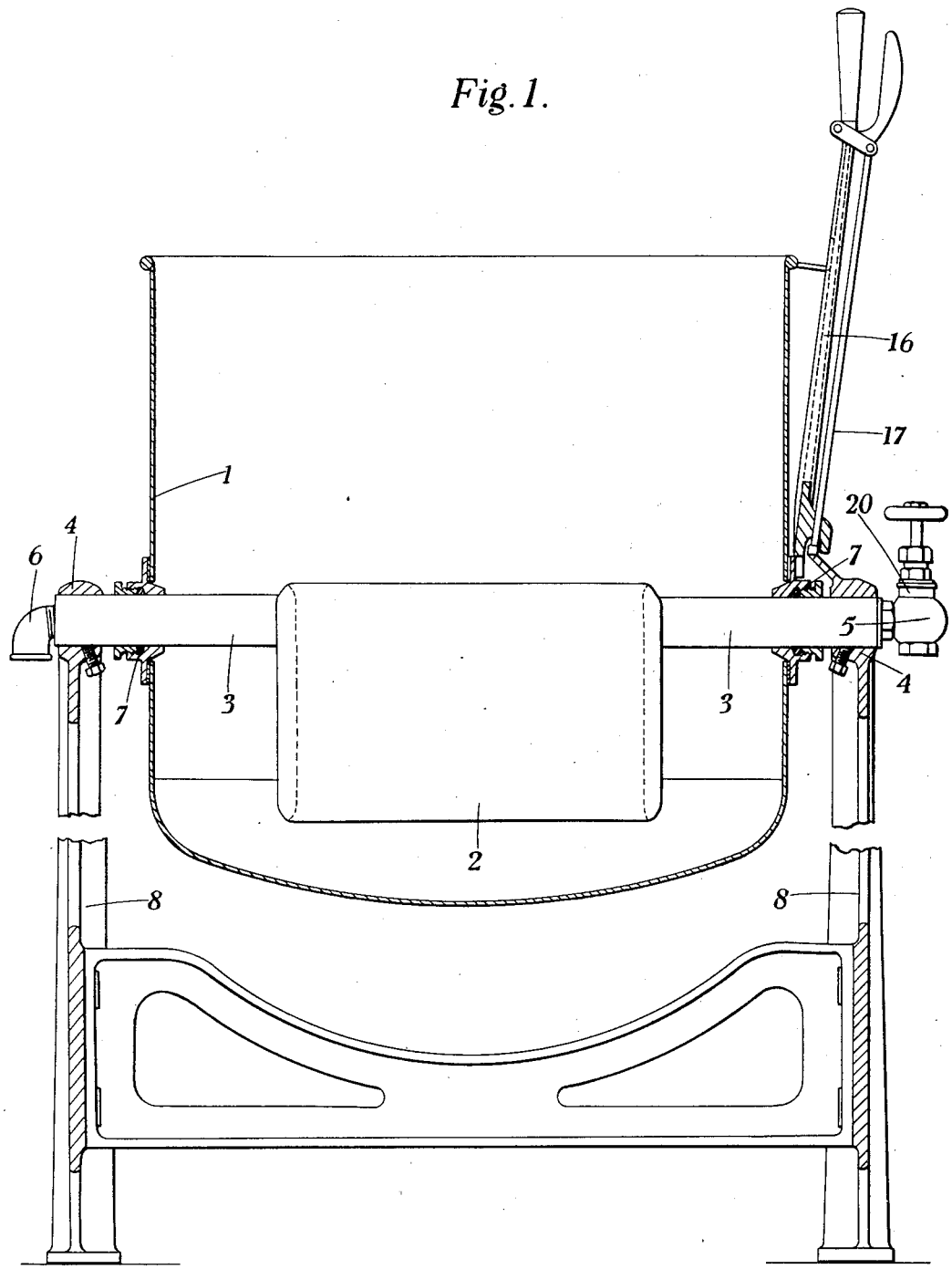

Jan. 9, 1934.　　　F. B. KERN ET AL　　　1,942,818
BOILING PAN, AUTOCLAVE, DIGESTER, AND THE LIKE
Filed March 10, 1933　　　5 Sheets-Sheet 1

INVENTORS
Francis Bernard Kern
Thomas Edward French
BY
Nathan, Bowman + Helfrich
ATTORNEYS

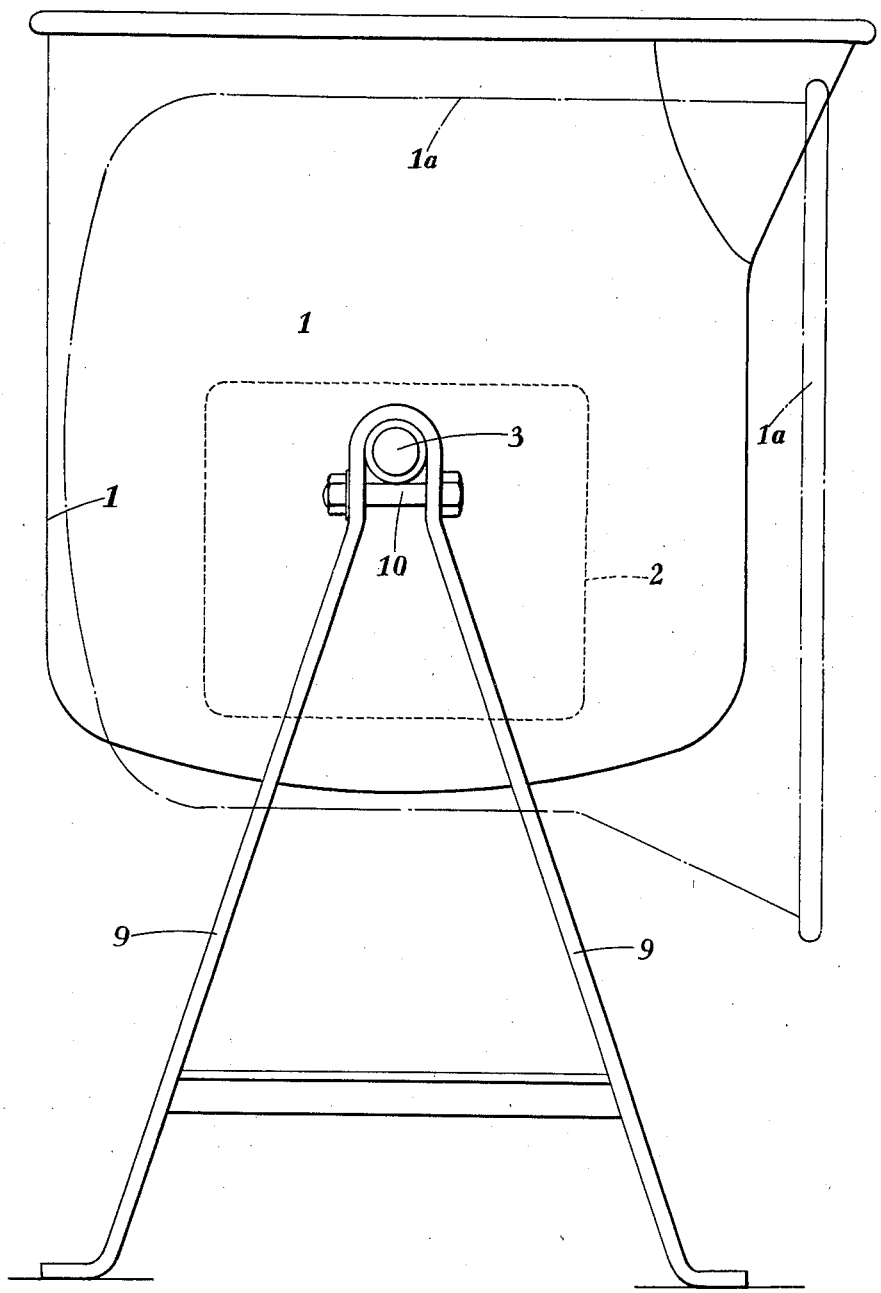

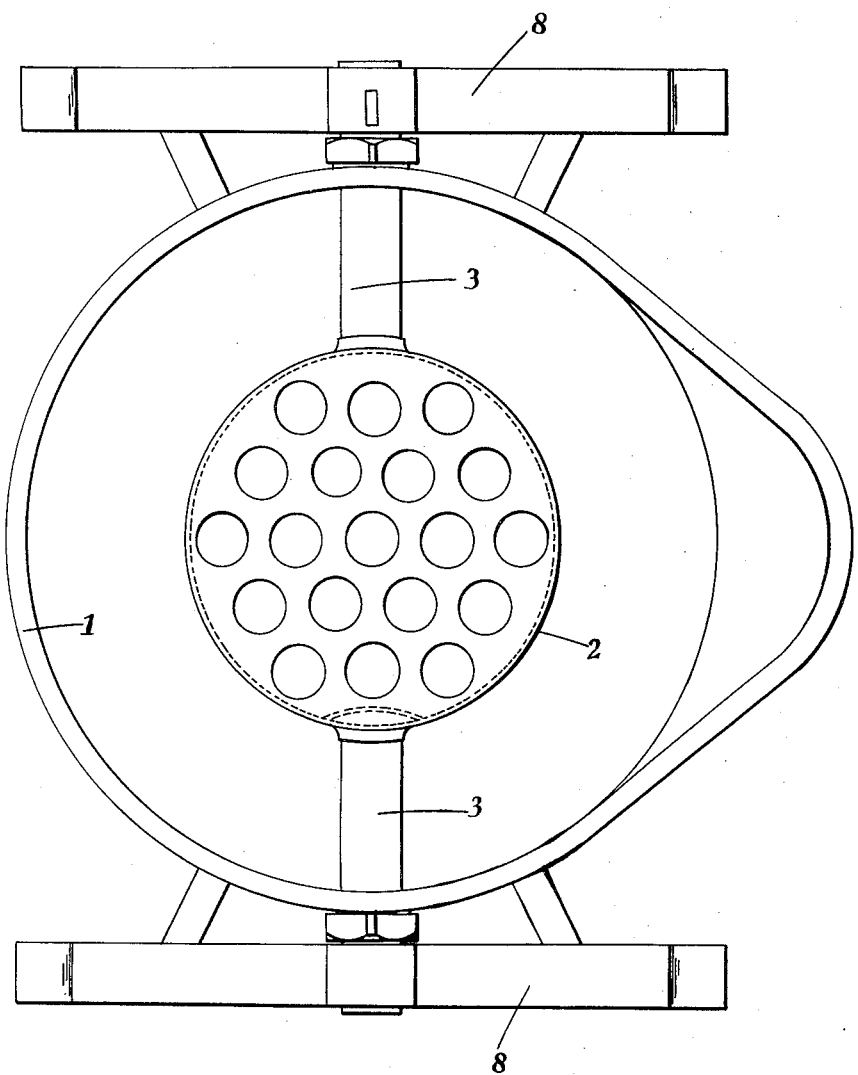

Jan. 9, 1934.   F. B. KERN ET AL   1,942,818
BOILING PAN, AUTOCLAVE, DIGESTER, AND THE LIKE
Filed March 10, 1933   5 Sheets-Sheet 4

INVENTORS
Francis Bernard Kern
Thomas Edward French
BY
Nathan, Bowman & Helferich
ATTORNEYS Jan. 9, 1934.   F. B. KERN ET AL   1,942,818
BOILING PAN, AUTOCLAVE, DIGESTER, AND THE LIKE
Filed March 10, 1933     5 Sheets-Sheet 5
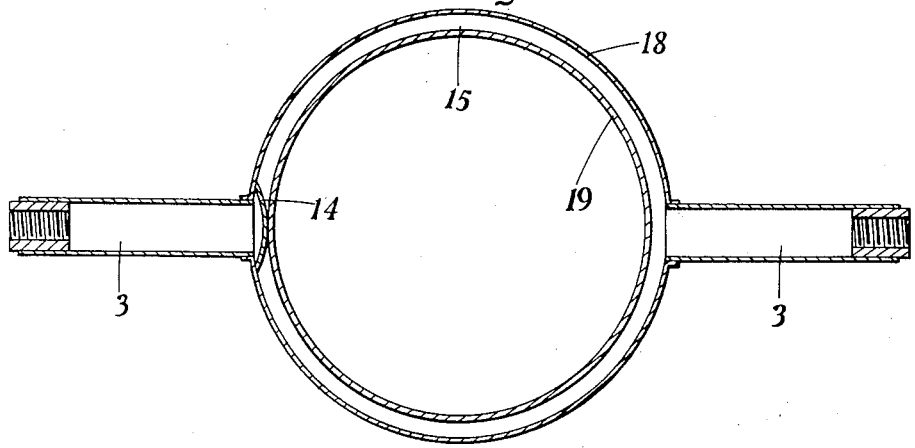
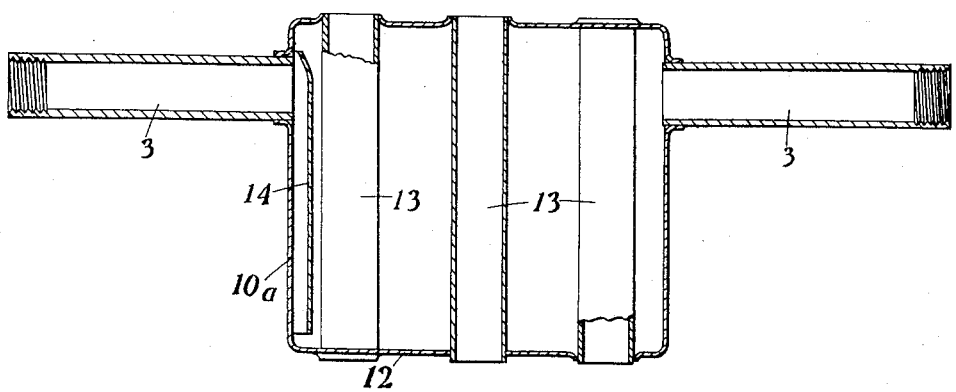
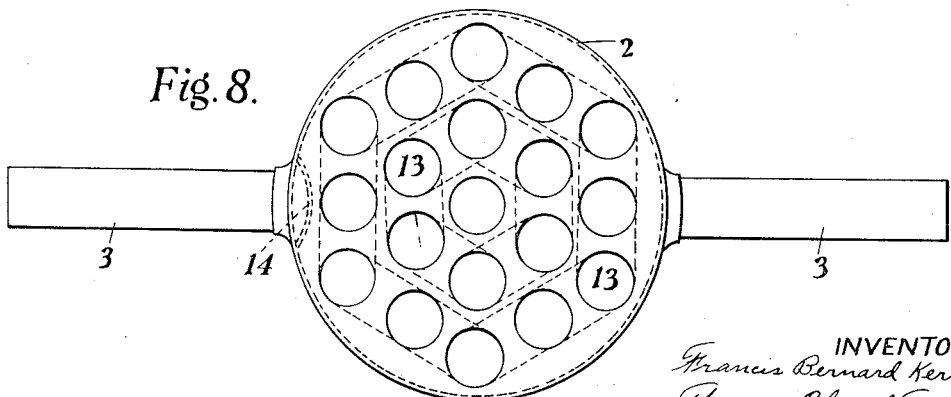
INVENTORS
Francis Bernard Kern
Thomas Edward French
BY
Nathan, Bowman & Helferich
ATTORNEYS Patented Jan. 9, 1934

1,942,818

UNITED STATES PATENT OFFICE 1,942,818

BOILING PAN, AUTOCLAVE, DIGESTER, AND THE LIKE

Francis Bernard Kern and Thomas Edward French, Surrey, England, assignors to The Aluminum Plant & Vessel Company Limited, London, England, a British Company Application March 10, 1933, Serial No. 660,248, and in Great Britain March 23, 1932

9 Claims. (Cl. 159—34)

This invention relates to improvements in boiling pans.

An object of the invention is to provide an improved construction of open-top boiling pan or the like, which is noted for its simplicity in design, low cost of upkeep, and efficiency in use.

Another object of the invention is to provide a construction of tilting pan or the like favorable to manufacturing economies.

With tilting pans or the like in general use the heating surfaces take the form of a jacket around the pan and/or fixed coils in the pan, in which cases the rate of heat transfer is low, and, further, the circulation is unduly localized, the heating surfaces being concentrated round the skin or outer layer of the material. Moreover, with the usual constructions the parts having the passages for the heating fluid on the pan must be arranged to be capable of movement relative to the fixed parts or connections, this entailing costly construction and skilled workmanship, and particularly with fabricated pans care has to be taken to prevent fluid leakage at the trunnion. The usual form of gland requires constant repacking during usage. With constructions according to the present invention this manufacturing concern and after repacking are eliminated.

Moreover with boiling pans or the like in general use the jacket and the inner vessel have to be made thick in order to resist the high steam pressure employed and consequently manufacturing costs are high, whereas according to the present invention manufacturing costs are reduced.

A feature of the present invention consists of a heater element located in the pan or the like, the pan and the heater element being so arranged and related that the pan is capable of tilting or oscillating independently of the heater element.

By the use of a heater element located in the heart or core of the material to be heated circulation and heat transfer are promoted, the circulation not being so localized as when the heating surfaces are round the skin or outer layer of the material. By way of example, the heater element may be so constructed that the material can pass up through vertical passages of comparatively small cross section, the walls of which form heating surfaces, this construction giving a rapid circulation and consequent high rate of heat transfer.

It is to be understood however that the heater element may be of any desired form, placed in the heart or core of the material. By way of example only the heater element may be of plate-like form, or a multiple thereof, or a tubular construction such as a ring-like or single tube or a nested series or battery thereof.

The pan may be arranged to be easily removable from its bearings, for example, flexible connections may be used to the inlet and outlet for the heating fluid.

The accompanying drawings show by way of example constructional forms of tilting steam pans embodying the features of the present invention.

In the drawings:—

Figure 4:
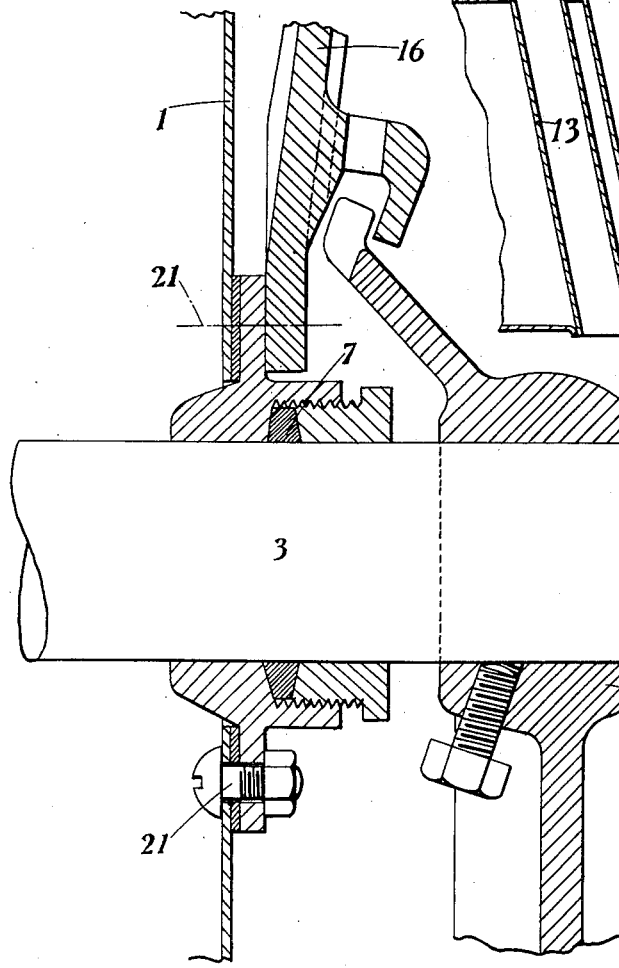
Figure 5:
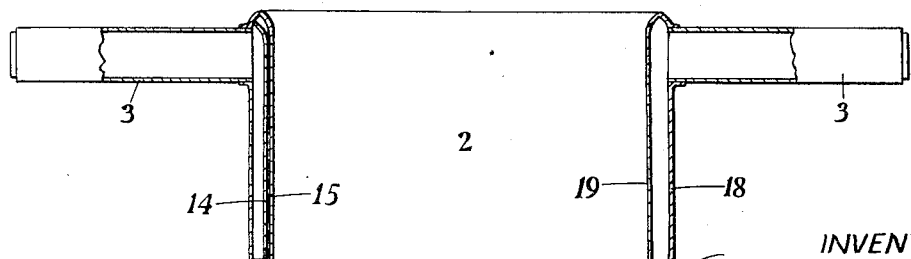

Fig. 1 is a sectional side elevation.
Fig. 2 an outside elevation.
Fig. 3 a plan view.
Fig. 4 a sectional view of the gland fitting.
Fig. 5 a sectional elevation of a ring-like heater.
Fig. 6 a sectional plan of Fig. 5.
Fig. 7 a sectional elevation of a tubular construction of heater.
Fig. 8 a plan of Fig. 7, and
Fig. 9 a detail view of the tubes hereinafter referred to.

Figs. 1 to 3 illustrate an open-top tilting pan 1 having a heater element 2 located in the pan or the like, by trunnions 3 extending through the sides of the pan and borne in bearings 4 outside of the pan, the pan being so mounted on the trunnions as to be capable of tilting or oscillating independently of the heater element. The ends of the trunnions are arranged to connect up with inlet and outlet heating medium systems 5 and 6 respectively.

The bearings 4 for the trunnions may be foreshortened with respect to the usual form of bearings, and the packing provision does not call for such careful fitting as with the usual kind of tilting pan, inasmuch as a simple liquid tight gland or stuffing box 7 is all that is required, it not being required to provide for steam or pressure tightness.

Each frame or standard 8 may be made up as shown in Fig. 2 of limbs 9 set at an angle to one another with the parts at the meeting angle end so arranged as to form a bearing for the appropriate trunnion a bolt 10 passing through the limbs below the trunnion, so that when the nut on the bolt is pulled up the trunnion is gripped.

The side frames or standards may be braced in any suitable way.

One form of heater element is of the multitubular type to promote circulation, and as shown by Figs. 7 and 8 consists of a closed vessel 10a having the trunnions 3 connected to its circular wall, and having top and bottom tube plates 11 and 12, to which open ended tubes 13 are secured by, for example, welding, the tubes providing an increased heating surface without unduly adding to the bulk of the heater element.

Figure 9:
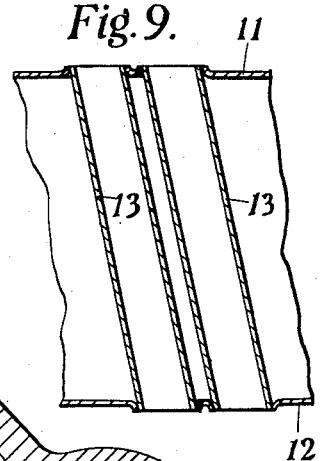

As shown by Fig. 9, the tubes may have an inclined setting, for example by the amount of one pitch. The tubes may be parallel-walled or splay-walled or splay-mounted. A baffle 14 may be provided around the condensate outlet.

Figs. 5 and 6 show a ring-like or shell heater 15. This form of heater is more suited for a normal rate of boiling than that shown by Figs. 7, 8 and 9, which is particularly suited for rapid boiling.

The heater according to Figs. 5 and 6 may be made up of two concentric shells 18 and 19, the ends thereof being swaged together and welded into an annular steam ring.

The heaters may be made of the same metal as the pan.

The size of heater varies, of course, according to the capacity of the pan.

The trunnions 3 may be welded to the heater element.

With the old type of jacketed pan both the liner and jacket have to be of fairly heavy gauge metal, but with the present invention as the pan does not have to withstand steam pressure it can be manufactured from comparatively light gauge metal.

The pan is mounted on the trunnions 3 by a pair of gland stuffing boxes 7.

16 and 17 denote a tilting arm and catch for the pan.

The pan is conveniently made of aluminium or any other metal and in any shape or form.

The inlet and outlet supply pipes etc., may be brought down the sides of the frames or standards, if desired. 20 denotes a steam inlet valve. As shown by Fig. 4 the pan 1 may be attached to the gland fitting by bolts 21.

By the foreshortened bearing surfaces 4 the overall floor space taken up by the apparatus is decreased in the direction of the trunnion axis so that space economy is attained.

The pan or the like is easy to clean, circulation is promoted, and loss by heat radiation is minimized.

The dotted outline 1a in Fig. 2 represents the pan when tilted or oscillated for emptying.

The pan may be arranged to be rocked or oscillated continuously or at certain periods during the boiling or other operation and apart from the tilting or oscillation for emptying the contents.

As other embodiments of the present invention may be made, and as the parts herein described may be varied in many ways, all without departing from the scope of the invention, it is to be understood that all matter herein set forth or shown in the accompanying drawings is to be interpreted as illustrative and not in a limiting sense.

What we claim is:—

1. An open-top boiling pan, comprising a heater element located in the pan, mounts extending through the sides of the pan and on which the heater element is carried, bearings outside the pan for said mounts, the pan being so mounted as to be capable of tilting independently of the heater element.

2. An open-top boiling pan, comprising a heater element located in the pan, trunnions extending through the sides of the pan and on which the heater element is carried, bearings outside the pan for said trunnions, the pan being so mounted on the trunnions as to be capable of tilting independently of the heater element.

3. An open-top boiling pan, comprising a heater element located in the pan, trunnions extending through the sides of the pan and on which the heater element is carried, bearings outside the pan for said trunnions, and connections from said trunnions to the inlet and outlet heating medium systems, the pan being so mounted on the trunnions as to be capable of tilting independently of the heater element.

4. An open-top boiling pan, comprising a non-jacketed pan, a heater element located in the pan, trunnions extending through the sides of the pan and on which the heater element is carried, bearings outside the pan for said trunnions, the pan being so mounted on the trunnions as to be capable of tilting independently of the heater element.

5. An open-top boiling pan, comprising a multitubular heater element located in the pan, trunnions extending through the sides of the pan and on which the heater element is carried, bearings outside the pan for said trunnions, the pan being so mounted on the trunnions as to be capable of tilting independently of the heater element.

6. An open-top boiling pan, comprising an annular ring heater element located in the pan, trunnions extending through the sides of the pan and on which the heater element is carried, bearings outside the pan for said trunnions, the pan being so mounted on the trunnions as to be capable of tilting independently of the heater element.

7. An open-top boiling pan, comprising a heater element located in the pan, trunnions extending through the sides of the pan and on which the heater element is carried, foreshortened bearings outside the pan for said trunnions, the pan being so mounted on the trunnions as to be capable of tilting independently of the heater element.

8. An open-top boiling pan, comprising a heater element located in the pan, trunnions extending through the sides of the pan and on which the heater element is carried, side frames, bearings on said side frames for said trunnions, the pan being so mounted on the trunnions as to be capable of tilting independently of the heater element.

9. An open-top boiling pan, comprising a heater element located in the pan, trunnions extending through the sides of the pan and on which the heater element is carried, bearings outside the pan for said trunnions, gland stuffing boxes for mounting the pan on the trunnions, the pan being capable of tilting independently of the heater element.

FRANCIS BERNARD KERN.
THOMAS EDWARD FRENCH.